(12) United States Patent
Huang et al.

(10) Patent No.: US 7,762,709 B2
(45) Date of Patent: Jul. 27, 2010

(54) BACKLIGHT MODULE

(75) Inventors: Yen-Chang Huang, Taipei County (TW); Kang-Chung Liu, Taichung (TW); Kun-Liang Chen, Nantou County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 12/188,185

(22) Filed: Aug. 7, 2008

(65) Prior Publication Data

US 2009/0303408 A1 Dec. 10, 2009

(30) Foreign Application Priority Data

Jun. 5, 2008 (TW) ............... 97120994 A

(51) Int. Cl.
*F21V 7/04* (2006.01)
(52) U.S. Cl. ............ 362/633; 362/632; 362/217.11; 362/217.1
(58) Field of Classification Search ......... 362/97.1, 362/97.2, 97.4, 217.1, 217.11, 217.12, 217.13, 362/217.14, 217.15, 217.16, 217.17, 632, 362/633, 634; 349/58
See application file for complete search history.

(56) References Cited

U.S. PATENT DOCUMENTS

| | | | | |
|---|---|---|---|---|
| 6,392,723 B1 * | 5/2002 | Sugiyama et al. | ............. | 349/58 |
| 7,097,338 B2 | 8/2006 | Li et al. | | |
| 7,460,193 B2 * | 12/2008 | Matsuoka | .................. | 349/58 |
| 2002/0001184 A1 * | 1/2002 | Kim et al. | ................... | 362/633 |
| 2006/0124955 A1 | 6/2006 | Sakakibara | | |
| 2007/0064448 A1 * | 3/2007 | Yu et al. | .................... | 362/633 |
| 2008/0303971 A1 * | 12/2008 | Lee et al. | ...................... | 349/58 |

FOREIGN PATENT DOCUMENTS

| | | |
|---|---|---|
| CN | 1584690 | 2/2005 |
| CN | 1854847 | 11/2006 |
| CN | 1928655 | 3/2007 |
| JP | 2004-103333 | 4/2004 |
| JP | 2005-353486 | 12/2005 |
| KR | 10-0732998 | 6/2007 |
| TW | I274919 | 3/2007 |
| TW | I287149 | 9/2007 |

OTHER PUBLICATIONS

"1st Office Action of China counterpart application", issued on May 8, 2009, p. 1-p. 4.

* cited by examiner

*Primary Examiner*—Y My Quach Lee
(74) *Attorney, Agent, or Firm*—Jianq Chyun IP Office

(57) ABSTRACT

A backlight module including a back bezel, a frame, and a backlight source is provided. The back bezel has a bottom carrier and a side wall extending upward from an edge of the bottom carrier so as to define a containing space. The side wall has a through hole and a reverse bending structure. The reverse bending structure is bent downward into the containing space for shielding a portion of the through hole. Parts of the region of the back bezel are covered with the frame and a portion of the frame extends from the containing space into the through hole and covers the reverse bending structure. The backlight source is disposed in the containing space located over the back bezel and the frame.

15 Claims, 6 Drawing Sheets

BACKLIGHT MODULE

CROSS-REFERENCE TO RELATED APPLICATION

This application claims the priority benefit of Taiwan application serial no. 97120994, filed on Jun. 5, 2008. The entirety of the above-mentioned patent application is hereby incorporated by reference herein and made a part of this specification.

BACKGROUND OF THE INVENTION

1. Field of the Invention

The present invention relates to a light source, in particularly, to a backlight module.

2. Description of Related Art

FIG. 1A is a schematic view of a conventional liquid crystal display module (LCM). FIG. 1B is a sectional view taken along a line L1-L1' of FIG. 1A. Referring to FIGS. 1A and 1B, a liquid crystal display module (LCM) 180 includes a liquid crystal display panel (LCD panel) 170 and a backlight module 100. The LCD panel 170 is disposed in the backlight module 100. The backlight module 100 includes a back bezel 130, a frame 140, a backlight source 150, and a front bezel 160. The back bezel 130 has a bottom carrier 132 and a side wall 134. A containing space C' is defined by the bottom carrier 132 and the side wall 134. The containing space C' is adapted to dispose the backlight source 150 and the LCD panel 170. The backlight source 150 and the LCD panel 170 are disposed over the back bezel 130 and the frame 140. The backlight source 150 is disposed beneath the LCD panel 170 so as to provide a light source for the LCD panel (the backlight source 150 is merely illustrated to occupy a volume, and the detailed structure of the backlight source 150 is omitted). The front bezel 160 is assembled with the back bezel 130, and the backlight source 150 and the LCD panel 170 are disposed between the front bezel 160 and the back bezel 130.

In the prior art, the frame 140 may be fabricated by a mold injection process. In detail, in a common mold injection process, the back bezel 130 is fixed in a mold, and the plastic material is then injected into the mold to form the frame 140 on the back bezel 130 in the mold. Generally speaking, in order to prevent the back bezel 130 peeling from the frame 140, the side wall 134 usually has a reverse bending structure 134R (as shown in FIG. 1B) so as to enhance the joining strength of the back bezel 130 and the frame 140. However, the reverse bending structure 134R can only enhance the joining strength of the back bezel 130 and the frame 140 in z direction. Obviously, the reverse bending structure 134R cannot enhance the joining strength of the back bezel 130 and the frame 140 in x direction or y direction. Therefore, the overall joining strength of the back bezel 130 and the frame 140 of the backlight module 100 is not sufficient.

As shown in FIG. 1B, the back bezel 130 is generally a hard and rigid material. Since the reverse bending structure 134R of the back bezel 130 usually has an arc top surface S' and the arc top surface S' of the reverse bending structure 134R must be in contact with the mold, the mold is easily scratched by the arc top surface S' of the rigid material, and thus the lifespan of the mold is reduced.

SUMMARY OF THE INVENTION

Accordingly, the present invention is directed to a backlight module, in which the joining of the back bezel and the frame is good.

The present invention provides a backlight module, which includes a back bezel, a frame, and a backlight source. The back bezel has a bottom carrier and a side wall extending upward from an edge of the bottom carrier so as to define a containing space. The side wall has a through hole and a reverse bending structure. The reverse bending structure is bent downward into the containing space for shielding a portion of the through hole. Parts of the region of the back bezel are covered with the frame and a portion of the frame extends from the containing space into the through hole and covers the reverse bending structure. The backlight source is disposed in the containing space located over the back bezel and the frame.

In an embodiment of the present invention, the back bezel is a metal back bezel.

In an embodiment of the present invention, the reverse bending structure has an arc top surface covered with the frame.

In an embodiment of the present invention, a volume of the portion of the frame in the through hole is substantially equal to a volume of the through hole.

In an embodiment of the present invention, the portion of the frame in the through hole is structural interfered by the reverse bending structure so as to enhance a joining strength of the frame and the back bezel.

In an embodiment of the present invention, the backlight source is an edge-type backlight source or a direct-type backlight source.

In an embodiment of the present invention, the backlight module further includes a front bezel. The front bezel is assembled with the back bezel. In an embodiment, the front bezel is a metal front bezel.

Since the present invention utilizes the through hole of the back bezel fitted with the reverse bending structure of the back bezel, the joining between the back bezel and the frame is enhanced, thereby preventing the frame easily peeling off from the back bezel.

In order to make the foregoing features and advantages of the present invention more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
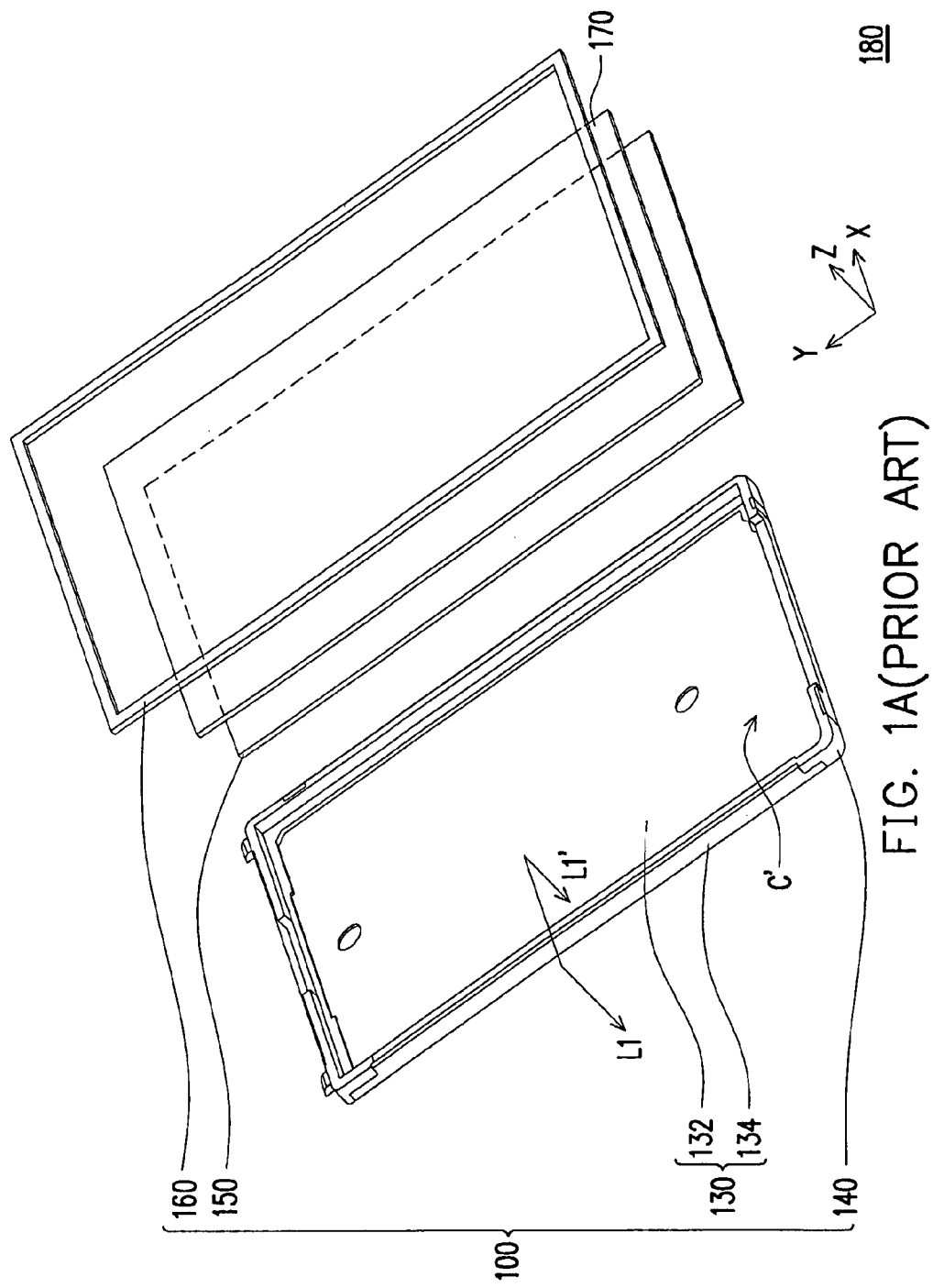
FIG. 1A is a schematic view of a conventional LCM.
Figure 1B:
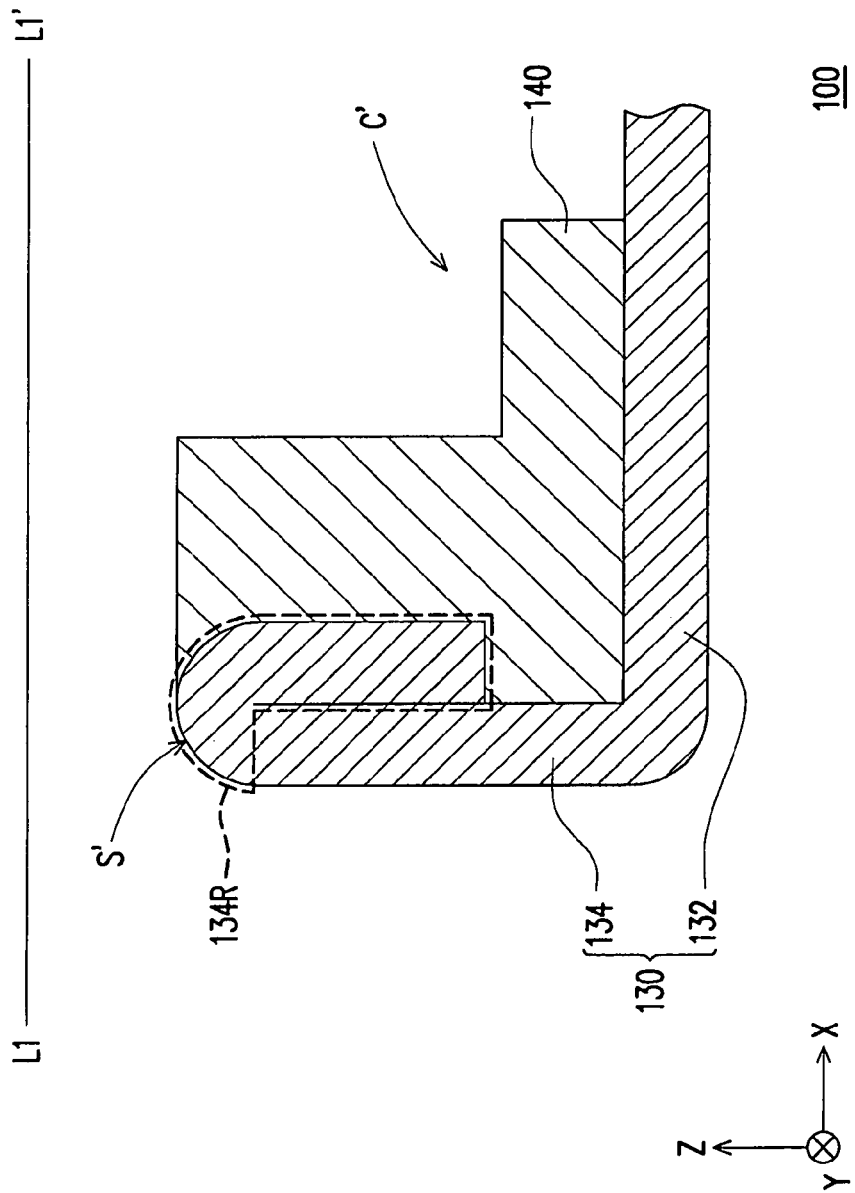
FIG. 1B is a sectional view taken along a line L1-L1' in FIG. 1A.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
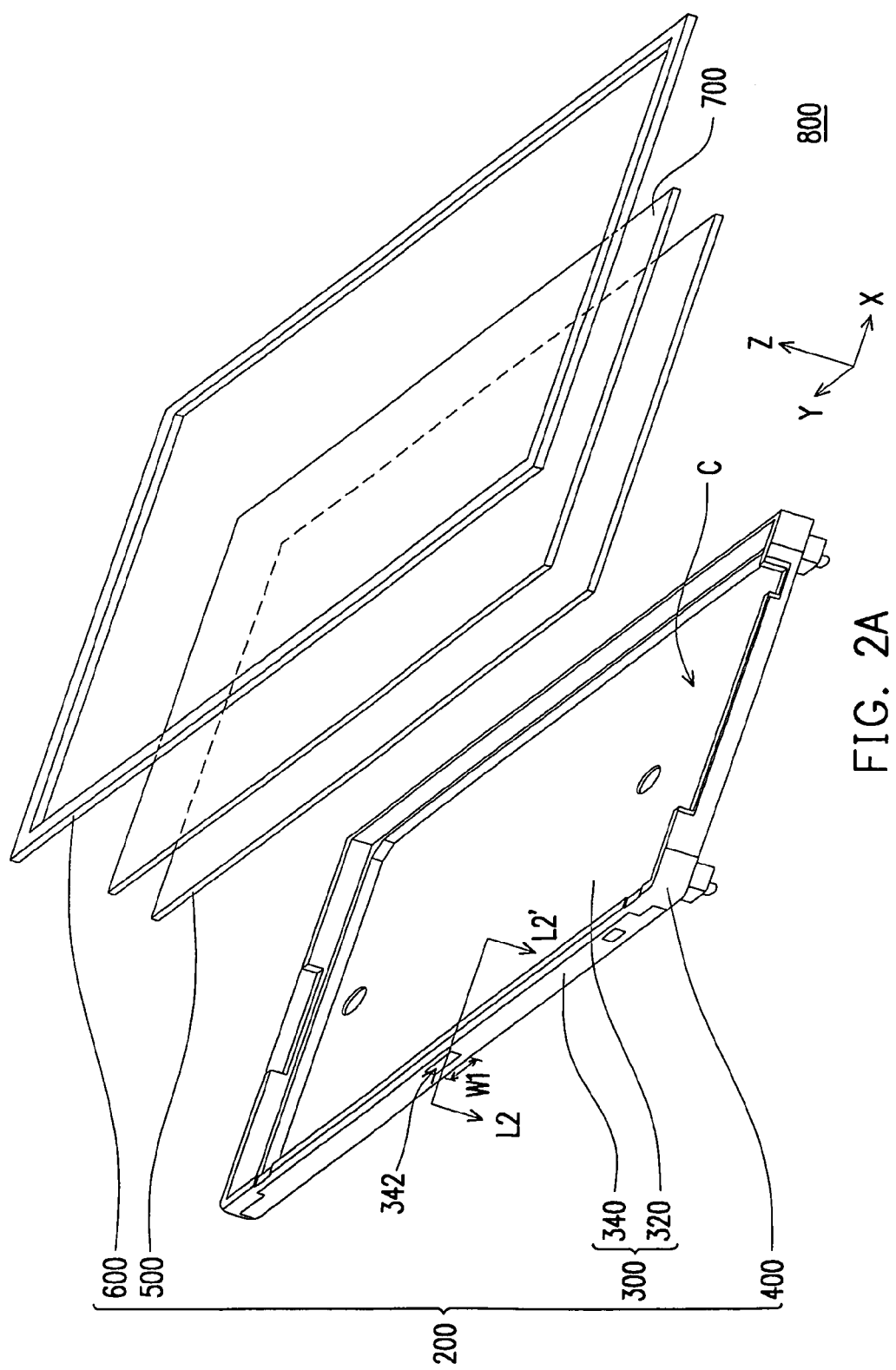
FIG. 2A is a schematic view of an LCM according to an embodiment of the present invention.
Figure 2B:
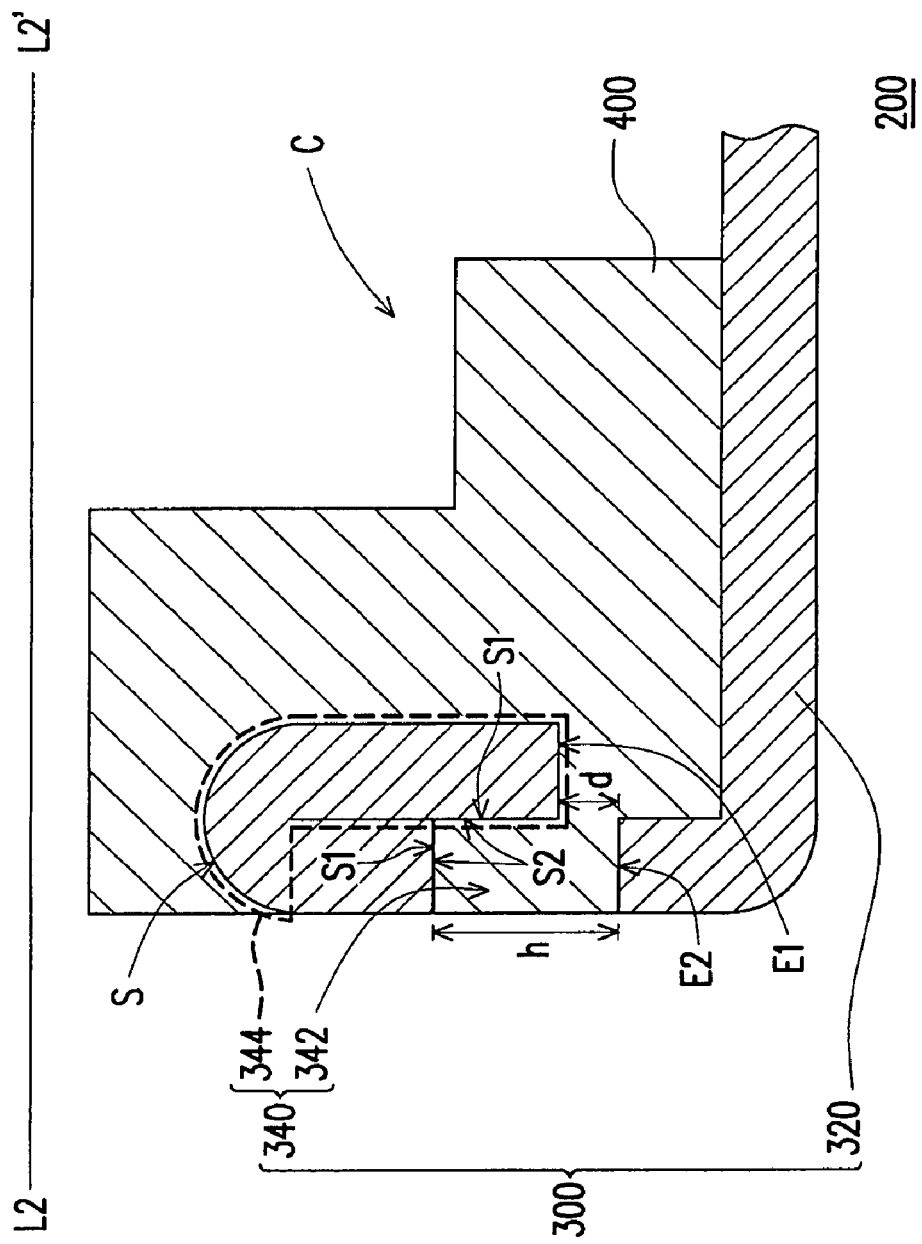
FIG. 2B is a partial schematic view taken along a line L2-L2' in FIG. 2A.

Generally speaking, the backlight module is applicable to a liquid crystal display module (LCM). Therefore, the LCM is taken as an example for illustrating the backlight module according to an embodiment of the present invention. FIG. 2A is a schematic view of an LCM according to an embodiment of the present invention. FIG. 2B is a partial schematic view taken along a line L2-L2' in FIG. 2A. Referring to FIGS. 2A and 2B, the backlight module 200 in this embodiment includes a back bezel 300, a frame 400, and a backlight source 500. The back bezel 300 has a bottom carrier 320 and a side wall 340 extending upward from an edge of the bottom carrier 320 so as to define a containing space C. The side wall 340 has a through hole 342 and a reverse bending structure 344. Parts of the region of the back bezel 300 are covered with the frame 400. The backlight source 500 is disposed in the containing space C located over the back bezel 300 and the frame 400. The backlight source 500 may be an edge-type backlight source mainly constituted of a light source, a light guide plate, an optical film, and other components. Definitely, the backlight source 500 may also be a direct-type backlight source or a light source of other type. The type of the backlight source 500 is not limited in the present invention. In addition, the backlight source 500 as shown in FIG. 2A is merely illustrated to occupy a volume, and the detailed structure is omitted.

The backlight module 200 in this embodiment may further include a front bezel 600. The front bezel 600 is, for example, a metal front bezel. In this embodiment, the backlight source 500 and the LCD panel 700 may be disposed over the back bezel 300 and the frame 400. The front bezel 600 may be assembled with the back bezel 300 carrying the backlight source 500 and the LCD panel 700, and thus the fabrication of an LCM 800 is completed.

As shown in FIG. 2B, the reverse bending structure 344 is bent downward into the containing space C for shielding a portion of the through hole 342. In this embodiment, a height of the through hole 342 is h, and a distance from an edge E1 of the reverse bending structure 344 to a lower edge E2 of the through hole 342 of the back bezel 300 is d. The distance d is determined based on the principle that the side wall 340 and the frame 400 are able to form a structural interference, and thus the selection of the distance d is related to the material properties (for example, rigidity of the material) of the frame 400 to some extent, so as to ensure the strength of the structural interference between the side wall 340 and the frame 400. However, the complexity of the fabrication of the frame 400 is also one of the key points that should be taken into consideration. In detail, when the frame 400 is fabricated by injection molding, whether the material in liquid state can easily flow into the through hole 342 is also related to the distance d. For example, in the case of the liquid material with high viscosity, a larger distance d is required to facilitate the formation of the frame 400 with no assembly gap between the back bezel 300 and the frame 400. In other words, the height h and the distance d are determined based on multiple factors. Therefore, a designer needs to adjust the height h and the distance d depending on the product properties and the related design rules.

Particularly, a portion of the frame 400 extends from the containing space C into the through hole 342 and covers the reverse bending structure 344 such that a volume of the portion of the frame 400 in the through hole 342 is substantially equal to a volume of the through hole 342. In other words, in this embodiment, a surface S1 of the back bezel 300 in the through hole 342 is substantially adhered to a surface S2 of the portion of the frame 400 in the through hole 342. Specifically, when the surface S1 of the back bezel 300 in the through hole 342 is substantially adhered to the surface S2 of the portion of the frame 400 in the through hole 342, it is allowable that a few of gaps or voids exist between the surface S1 and the surface S2 due to the process factors or other factors.

Figure 2C:
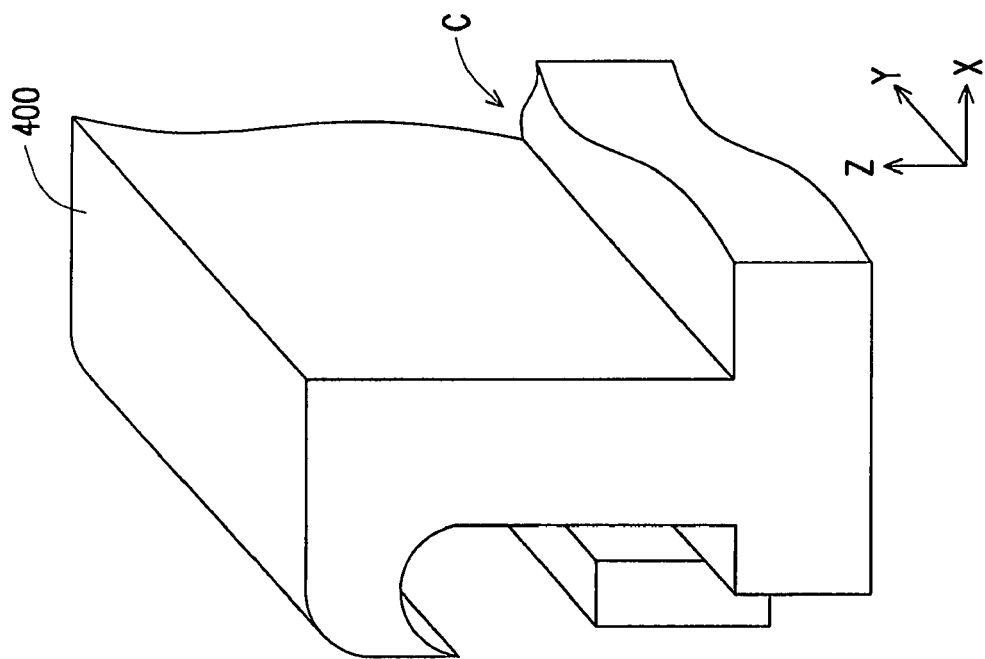
FIG. 2C is a partial schematic view of a back bezel and a frame according to an embodiment of the present invention.
Figure 2C:
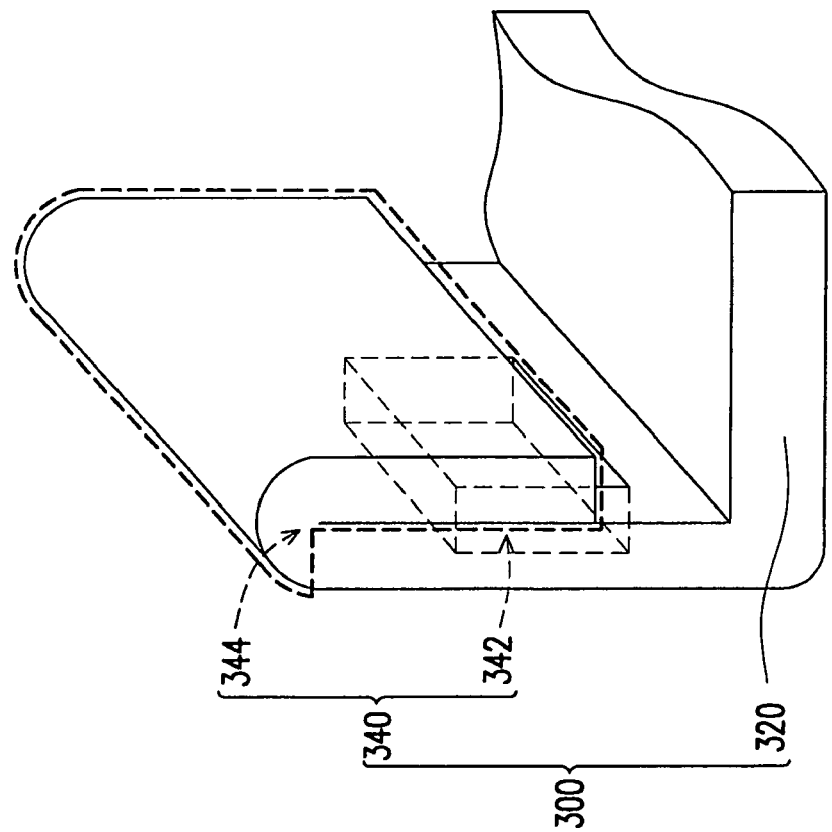

FIG. 2C is a partial schematic view of a back bezel and a frame according to an embodiment of the present invention. The back bezel and the frame in FIG. 2C may form the structural interference between the back bezel and the frame in FIG. 2B. Referring to FIGS. 2B and 2C, a portion of the frame 400 in this embodiment extends from the containing space C into the through hole 342 and covers the reverse bending structure 344, such that the portion of the frame 400 in the through hole 342 can be structural interfered by the reverse bending structure 344. The structural interference may be generated between the portion of the frame 400 in the through hole 342 and the reverse bending structure 344 in an x direction and z direction. However, this structural interference may further enhance the joining strength of the frame 400 and the back bezel 300. Furthermore, when the backlight module 200 is impacted, the structural interference formed between the portion of the frame 400 in the through hole 342 and the reverse bending structure 344 can prevent the separation of the frame 400 and the back bezel 300 in x direction and z direction.

In view of the above, the structural interference may be generated between the frame 400 in the through hole 342 and the back bezel 300 in y direction on an interface between the back bezel 300 and the through hole 342. Since this structural interference may cause a counterbalancing acting force between the back bezel 300 and the frame 400 in the through hole 342, the frame 400 and the back bezel 300 also will not easily peel from each other in y direction when the backlight module 200 is under the impact.

Moreover, the back bezel 300 in this embodiment is, for example, a metal back bezel 300. Since the back bezel 300 possesses malleability, the reverse bending structure 344 formed by applying an external force to the back bezel 300 may have an arc top surface S. As shown in FIG. 2B, the interference is also generated between the arc top surface S and the frame 400 covering the arc top surface S in x direction and z direction. Therefore, in this embodiment, the arc top surface S covered with the frame 400 also results in the enhancement of the joining strength of the frame 400 and the back bezel 300.

In practice, the structure that the back bezel 300 and the frame 400 are embedded into each other may be formed by the mold injection process so as to generate the structure that the frame 400 in the through hole 342 and the reverse bending structure 344 are structural interfered with each other and the structure that the arc top surface S is covered with the frame 400. It is worth mentioning that in this embodiment, in order to form the structure that the arc top surface S is covered with the frame 400, the mold is in contact with the frame 400 made of a soft material instead of the arc top surface S on the back bezel 300. In other words, in the mold design, friction will not occur between the arc top surface S on the back bezel 300 and the mold. Therefore, the mold covered with the frame 400 of the soft material is less possible to be oppressed by the back bezel 300.

Figure 3:
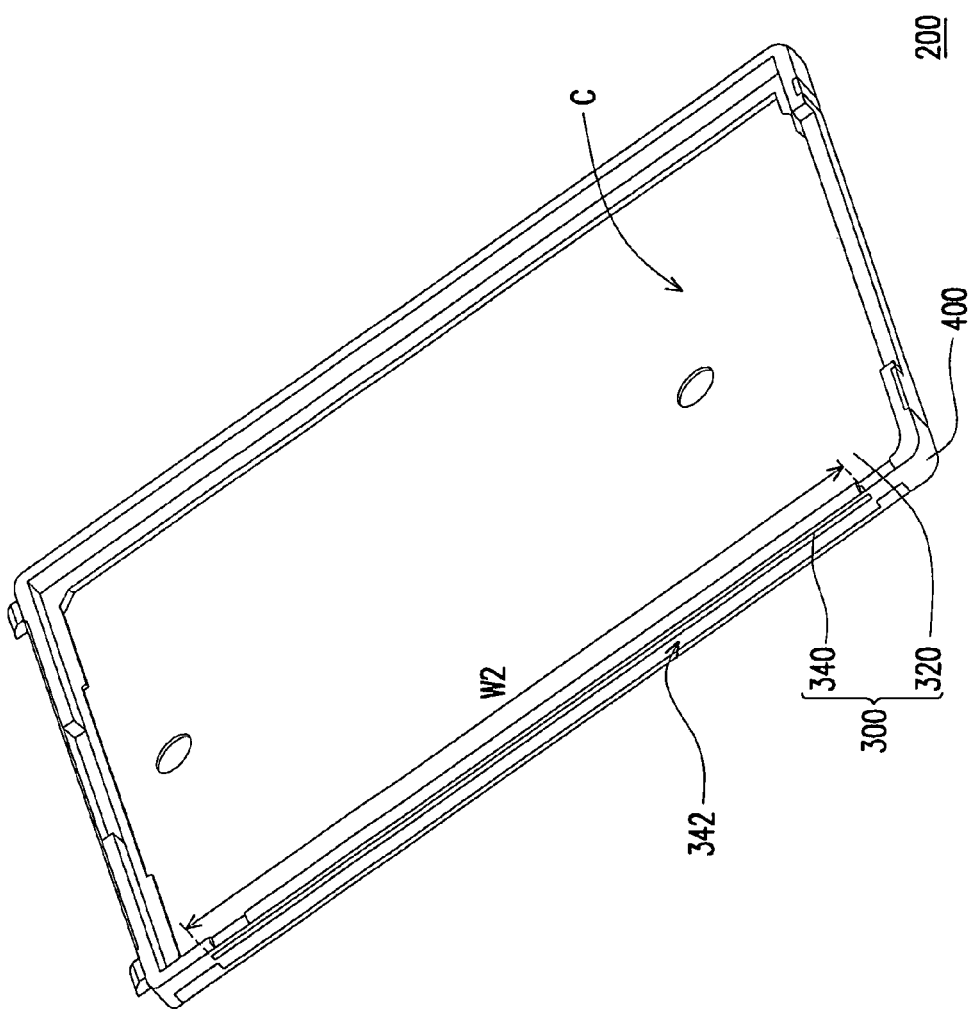
FIG. 3 is a schematic view of another backlight module according to an embodiment of the present invention.

It is worth mentioning that in this embodiment, a width W1 (as shown in FIG. 2A) of the through hole 342 may be adjusted depending on the product requirements. FIG. 3 is a schematic view of another backlight module according to an embodiment of the present invention, and the backlight source 500, the front bezel 600, and other parts are omitted. Referring to FIGS. 2A and 3, a width W2 of the through hole 342 in FIG. 3 is larger than the width W1 of the through hole 342 in FIG. 2A. The through hole 342 of the larger width W2 is contributive to enhance the joining strength of the frame 400 and the back bezel 300 so as to prevent the separation of the frame 400 and the back bezel 300.

In view of the above, the back bezel of the backlight module of the present invention has a through hole, and the interference structure formed by the back bezel and a frame in the through hole can improve the joining between the back bezel and the frame in x, y, and z directions. Therefore, when the backlight module of the present invention is under an external force or impact, the back bezel and the frame will not easily peel from each other in x, y, and z directions. Moreover, the arc top surface of the back bezel of the present invention is in contact with the frame, so the contact area of the back bezel and the mold used in a mold injection process can be greatly reduced, and the mold is thus less possible to be oppressed by the back bezel.

It can be seen from the above that both the separation of the back bezel from the frame and the mold damage are alleviated. Therefore, the backlight module of the present invention contributes to improve the process yield. Moreover, the cost caused wasted by the undesired fabrication of backlight modules resulting from the poor joining between the back bezel and the frame can be greatly reduced, the lifespan of the mold is extended, and the cost for mold maintenance is saved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a back bezel comprising a bottom carrier and a side wall extending upward from an edge of the bottom carrier so as to define a containing space, wherein the side wall comprises a through hole and a reverse bending structure, and the reverse bending structure extends over a periphery region of the through hole and is bent downward into the containing space for shielding a portion of the through hole;
   a frame covering parts of the region of the back bezel, wherein a portion of the frame extends from the containing space into the through hole and covers the reverse bending structure; and
   a backlight source disposed in the containing space located over the back bezel and the frame.

2. The backlight module according to claim 1, wherein the back bezel is a metal back bezel.

3. The backlight module according to claim 1, wherein the reverse bending structure comprises an arc top surface covered with the frame.

4. The backlight module according to claim 1, wherein a volume of the portion of the frame in the through hole is substantially equal to a volume of the through hole.

5. The backlight module according to claim 1, wherein the portion of the frame in the through hole is structural interfered by the reverse bending structure so as to enhance a joining strength of the frame and the back bezel.

6. The backlight module according to claim 1, wherein the backlight source is an edge-type backlight source or a direct-type backlight source.

7. The backlight module according to claim 1, further comprising a front bezel assembled with the back bezel.

8. The backlight module according to claim 7, wherein the front bezel is a metal front bezel.

9. The backlight module according to claim 1, wherein the reverse bending structure of the side wall rests on a portion of the side wall extending upward from the edge of the bottom carrier.

10. A backlight module, comprising:
    a back bezel comprising a bottom carrier and a side wall extending upward from an edge of the bottom carrier so as to define a containing space, wherein the side wall comprises a through hole and a reverse bending structure, the reverse bending structure is bent downward into the containing space and shielding a portion of the through hole, and a portion of the reverse bending structure overlaps with the side wall;
    a frame covering parts of the region of the back bezel, wherein a portion of the frame extends from the containing space into the through hole and covers the reverse bending structure; and
    a backlight source disposed in the containing space located over the back bezel and the frame.

11. The backlight module according to claim 10, wherein the reverse bending structure comprises an arc top surface covered with the frame.

12. The backlight module according to claim 10, wherein a volume of the portion of the frame in the through hole is substantially equal to a volume of the through hole.

13. The backlight module according to claim 10, wherein the portion of the frame in the through hole is structural interfered by the reverse bending structure so as to enhance a joining strength of the frame and the back bezel.

14. The backlight module according to claim 10, further comprising a front bezel assembled with the back bezel.

15. The backlight module according to claim 10, wherein the reverse bending structure of the side wall rests on a portion of the side wall extending upward from the edge of the bottom carrier.

* * * * *